(12) United States Patent
Chen et al.

(10) Patent No.: US 10,976,488 B1
(45) Date of Patent: Apr. 13, 2021

(54) SILICON PHOTONIC PACKAGE STRUCTURE

(71) Applicant: Industrial Technology Research Institute, Hsinchu (TW)

(72) Inventors: Wei-Yen Chen, Taoyuan (TW); Sin-Jhu Wun, Hsinchu (TW); Shang-Chun Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/809,536

(22) Filed: Mar. 4, 2020

(30) Foreign Application Priority Data

Nov. 15, 2019 (TW) .................................. 108141626

(51) Int. Cl.
  *G02B 6/12* (2006.01)
  *G02B 6/42* (2006.01)
  *G02B 6/14* (2006.01)

(52) U.S. Cl.
  CPC ................. *G02B 6/12* (2013.01); *G02B 6/14* (2013.01); *G02B 6/4206* (2013.01); *G02B 6/4232* (2013.01); *G02B 2006/12061* (2013.01); *G02B 2006/12121* (2013.01); *G02B 2006/12152* (2013.01)

(58) Field of Classification Search
  None
  See application file for complete search history.

(56) References Cited

U.S. PATENT DOCUMENTS

| 5,854,867 A | 12/1998 | Lee et al. |
| 7,213,982 B2 | 5/2007 | Chen |
| 10,234,646 B2 | 3/2019 | Mack et al. |
| 2017/0219783 A1 | 8/2017 | Zhang et al. |

FOREIGN PATENT DOCUMENTS

| CN | 109343180 | 2/2019 |
| TW | I417589 | 12/2013 |
| WO | 2017127455 | 7/2017 |

*Primary Examiner* — Chad H Smith
(74) *Attorney, Agent, or Firm* — JCIPRNET (57) ABSTRACT

A silicon photonic package structure including a substrate, a conductive bump, an obstacle structure, a laser diode, a mode converter, and a ball lens is provided. The conductive bump is disposed on the substrate. The obstacle structure is formed on the substrate. The laser diode is disposed above the substrate and electrically bonded to the conductive bump. A surface of the laser diode facing the substrate has a ridge. An end of the ridge has a light-emitting surface. The obstacle structure is located between the conductive bump and the ridge. A thickness of the obstacle structure in a direction perpendicular to the surface of the substrate is greater than a thickness of the ridge in the direction perpendicular to the surface of the substrate. The mode converter is formed on the substrate. The ball lens is formed on the substrate and located between the light-emitting surface and a light input end of the mode converter.

10 Claims, 7 Drawing Sheets

SILICON PHOTONIC PACKAGE STRUCTURE

CROSS-REFERENCE TO RELATED APPLICATION

This application claims the priority benefit of Taiwan application no. 108141626, filed on Nov. 15, 2019. The entirety of the above-mentioned patent application is hereby incorporated by reference herein and made a part of this specification.

TECHNICAL FIELD

The disclosure relates a package structure, and more particularly, to a silicon photonic package structure.

BACKGROUND

Optical communication has prospered in recent years because the optical signal transmitted in the optical fiber may transmit farther distance with lower distortion than the electrical signal transmitted in the cable. Further, the introduction of silicon photonics technology in the field of optical communication has the advantages of cheap materials, mature process technology (a line width may be less than 20 nm) and wafer level optical-electronics device integration capability. Furthermore, if the manufacturing process is fully developed, the wafer may have low cost and high yield rate.

However, when the silicon photonics technology is adopted, the light source requires a heterogeneous integration, and the cost of packaging and testing is much greater than the cost of wafer fabrication. In the conventional silicon photonics technology, laser is adopted on silicon chip by direct alignment. Accordingly, as the alignment tolerance needs to be strictly controlled, extremely high precision is required for the bonding equipment. In addition, in the conventional art, no proper process is performed on the incident surface of the light beam. Therefore, the phenomenon of beam reflection may easily occur such that additional light may enter the laser cavity through reflection. Moreover, in the conventional art, the microlens is processed in an assembled manner. Consequently, the alignment precision needs to be accuracy defined, a volume of the microlens is too large, and additional components cause an increase in product cost.

SUMMARY

An embodiment of the disclosure proposes a silicon photonic package structure, which includes a substrate, a conductive bump, an obstacle structure, a laser diode, a mode converter, and a ball lens. The conductive bump is disposed on the substrate. The obstacle structure is formed on the substrate. The laser diode is disposed above the substrate and electrically bonded to the conductive bump. A surface of the laser diode facing the substrate has a ridge. An end of the ridge has a light-emitting surface. The obstacle structure is located between the conductive bump and the ridge. A thickness of the obstacle structure in a direction perpendicular to the surface of the substrate is greater than a thickness of the ridge in the direction perpendicular to the surface of the substrate. The mode converter is formed on the substrate. The ball lens is formed on the substrate and located between the light-emitting surface and a light input end of the mode converter. The ball lens converges a light emitted by the light-emitting surface at the light input end of the mode converter, and a volume of the laser diode is larger than a volume of the ball lens.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1A:
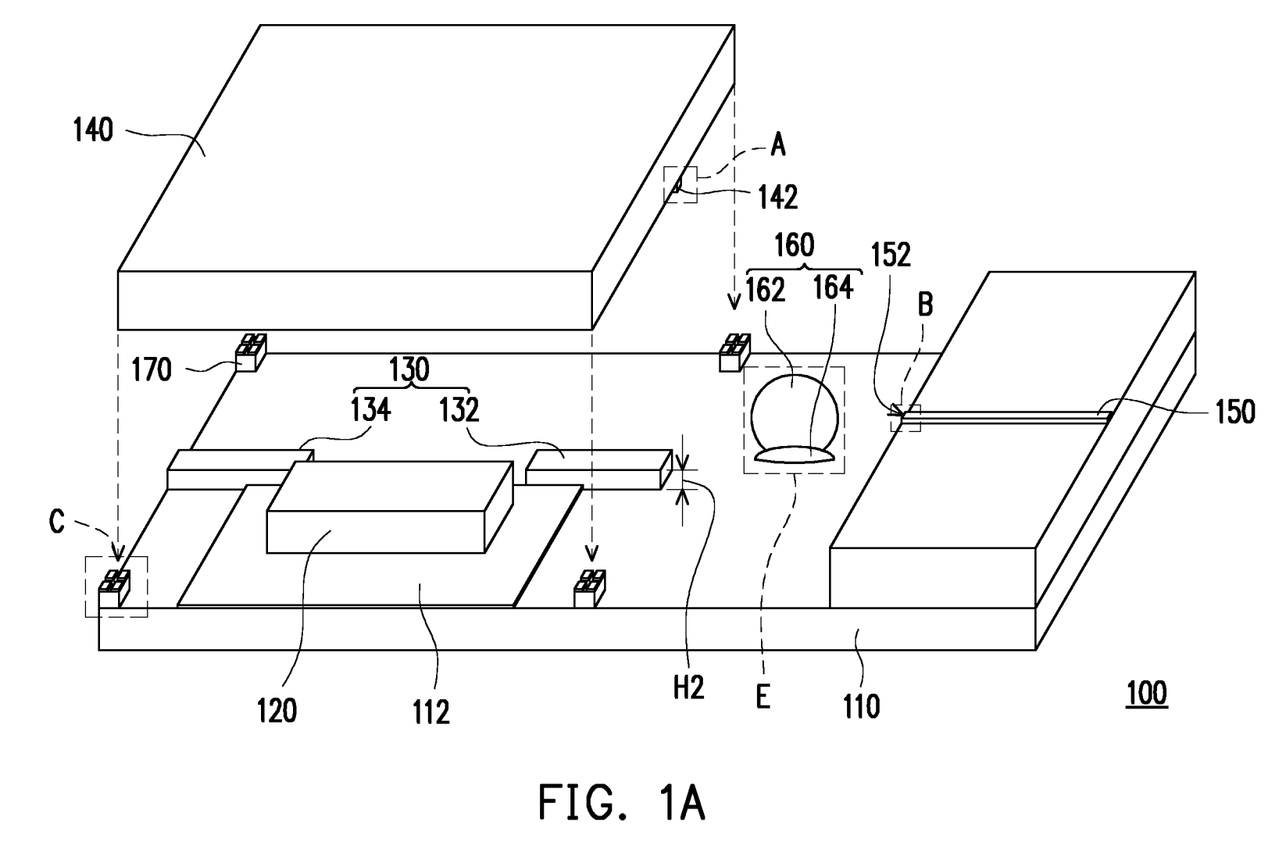
FIG. 1A is a 3D schematic view of a silicon photonic package structure before a laser diode is assembled to a substrate in an embodiment of the disclosure.
Figure 1B:
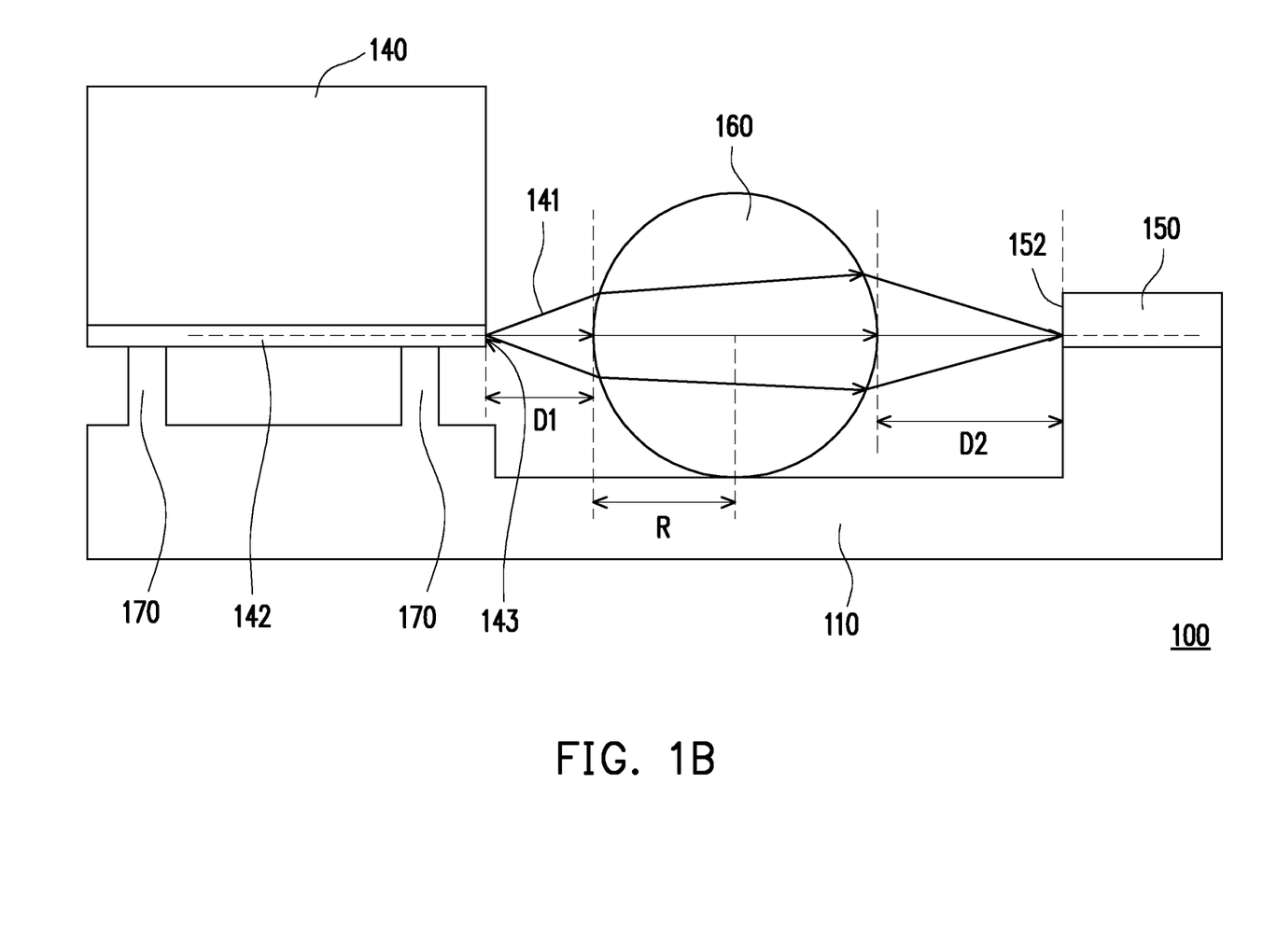
FIG. 1B is a cross-sectional view of the silicon photonic package structure of FIG. 1A.
Figure 2A:
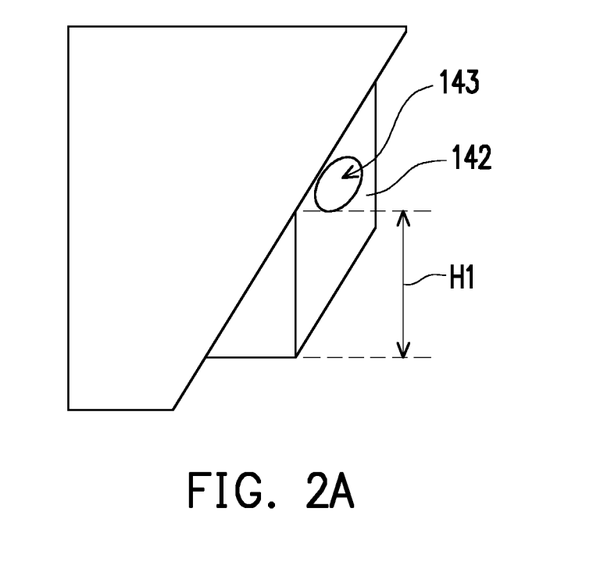
FIG. 2A is an enlarged view of a region A in FIG. 1A.
Figure 2B:
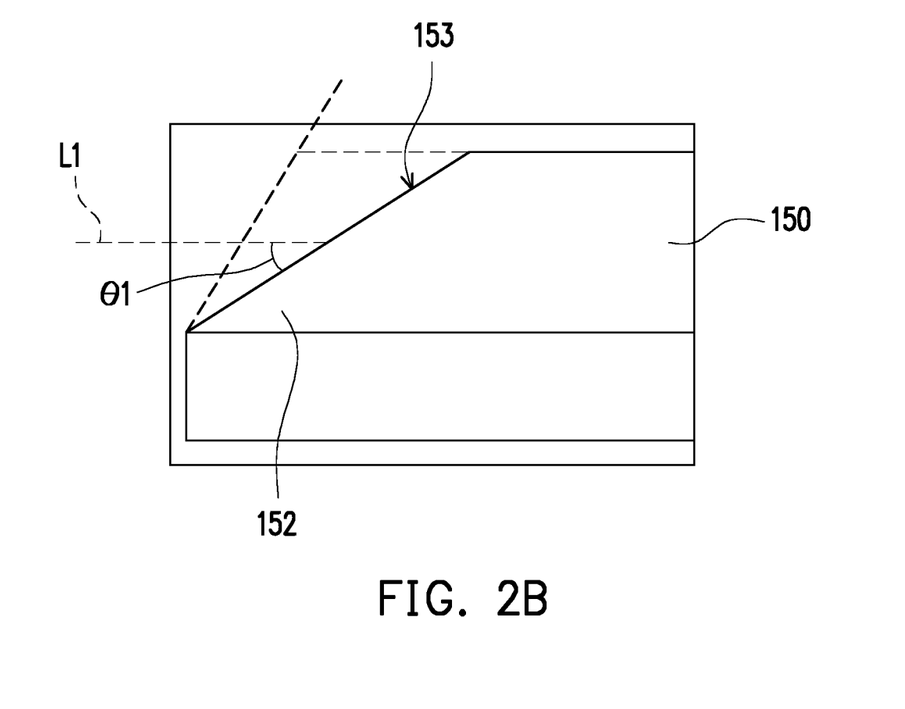
FIG. 2B is an enlarged view of a region B in FIG. 1A.
Figure 2C:
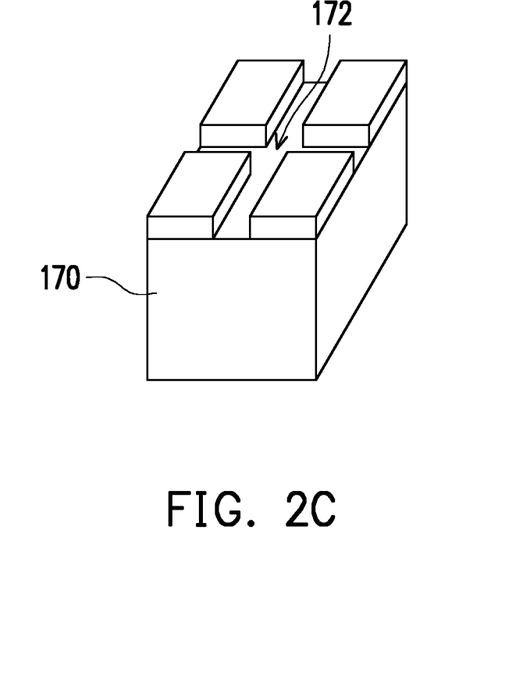
FIG. 2C is an enlarged view of a region C in FIG. 1A.
Figure 2D:
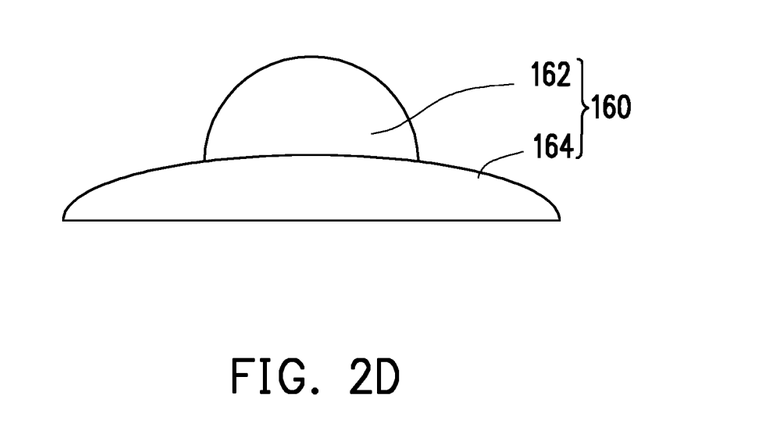
FIG. 2D is an enlarged view of a region E in FIG. 1A.

FIG. 1A is a 3D schematic view of a silicon photonic package structure before a laser diode is assembled to a substrate in an embodiment of the disclosure, and FIG. 1B is a cross-sectional view of the silicon photonic package structure of FIG. 1A. FIG. 2A is an enlarged view of a region A in FIG. 1A; FIG. 2B is an enlarged view of a region B in FIG. 1A; FIG. 2C is an enlarged view of a region C in FIG. 1A; and FIG. 2D is an enlarged view of a region E in FIG. 1A. Referring to FIG. 1A and FIG. 1B, a silicon photonic package structure 100 includes a substrate 110, a conductive bump 120, an obstacle structure 130, a laser diode 140, a mode converter 150, and a ball lens 160. The conductive bump 120 is disposed on the substrate 110. The obstacle structure 130 is formed on the substrate 110. In this embodiment, the substrate 110 is, for example, a silicon substrate, which is, for example, a circuit substrate of a photonic integrated circuit wafer. The conductive bump 120 is made of, for example, a solder. The laser diode 140 is disposed above the substrate 110 and electrically bonded to the conductive bump 120. Specifically, a pad 112 is provided on the substrate 110 and electrically connected to internal circuits of the substrate 110. A pad on a surface of the laser diode 140 facing the substrate 110 is electrically connected to the pad 112 via the conductive bump 120.

The surface of the laser diode 140 facing the substrate 110 has a ridge 142. An end of the ridge 142 has a light-emitting surface 143. In other words, a position of the ridge 142 is a position where a laser cavity is located.

The obstacle structure 130 is located between the conductive bump 120 and the ridge 142. A thickness H2 of the obstacle structure 130 in a direction perpendicular to the surface of the substrate 110 is greater than a thickness H1 of the ridge 142 in the direction perpendicular to the surface of the substrate 110 so that the ridge 142 does not abut and get damaged by the substrate 110. The mode converter 150 is formed on the substrate 110. In this embodiment, the mode converter 150 is, for example, a waveguide made of silicon oxynitride or silicon, for example.

The ball lens 160 is formed on the substrate 110 and located between the light-emitting surface 143 and a light input end 152 of the mode converter 150. The ball lens 160 converges a light 141 emitted by the light-emitting surface 143 (as shown by FIG. 1B, that is, laser light, such as far infrared light) at the light input end 152 of the mode converter 150, and a volume of the laser diode 140 is larger than a volume of the ball lens 160.

In the silicon photonic package structure 100 of the present embodiment, the ball lens 160 formed on the substrate 110 is adopted to converge the light 141 emitted by the laser diode 140 assembled on the substrate 110 at the mode converter 150 formed on the substrate 110. Therefore, an assembly tolerance range of the laser diode 140 may be expanded to help manufacturers in reducing the precision required for the bonding equipment, thereby increasing a yield rate of the silicon photonic package structure 100 and reducing its manufacturing cost. Specifically, both the ball lens 160 and the mode converter 150 may be fabricated on the substrate 110 by using a semiconductor process. Therefore, because the ball lens 160 and the mode converter 150 have high precision, the laser diode 140 bonded to the substrate 110 in an assembled manner may have a larger tolerance range and the silicon photonic package structure 100 can have a favorable optical coupling efficiency. Further, the ball lens 160 fabricated by adopting the semiconductor process may have a smaller volume which helps reduction in overall cost. The ball lens 160 is made of, for example, a polymer having a diameter of less than 50 micrometers with position and size accurately defined by the semiconductor process so that the ball lens 160 may accurately converge the light 141 emitted by the light-emitting surface 143 to increase an optical collection efficiency of the mode converter 150.

Figure 2E:
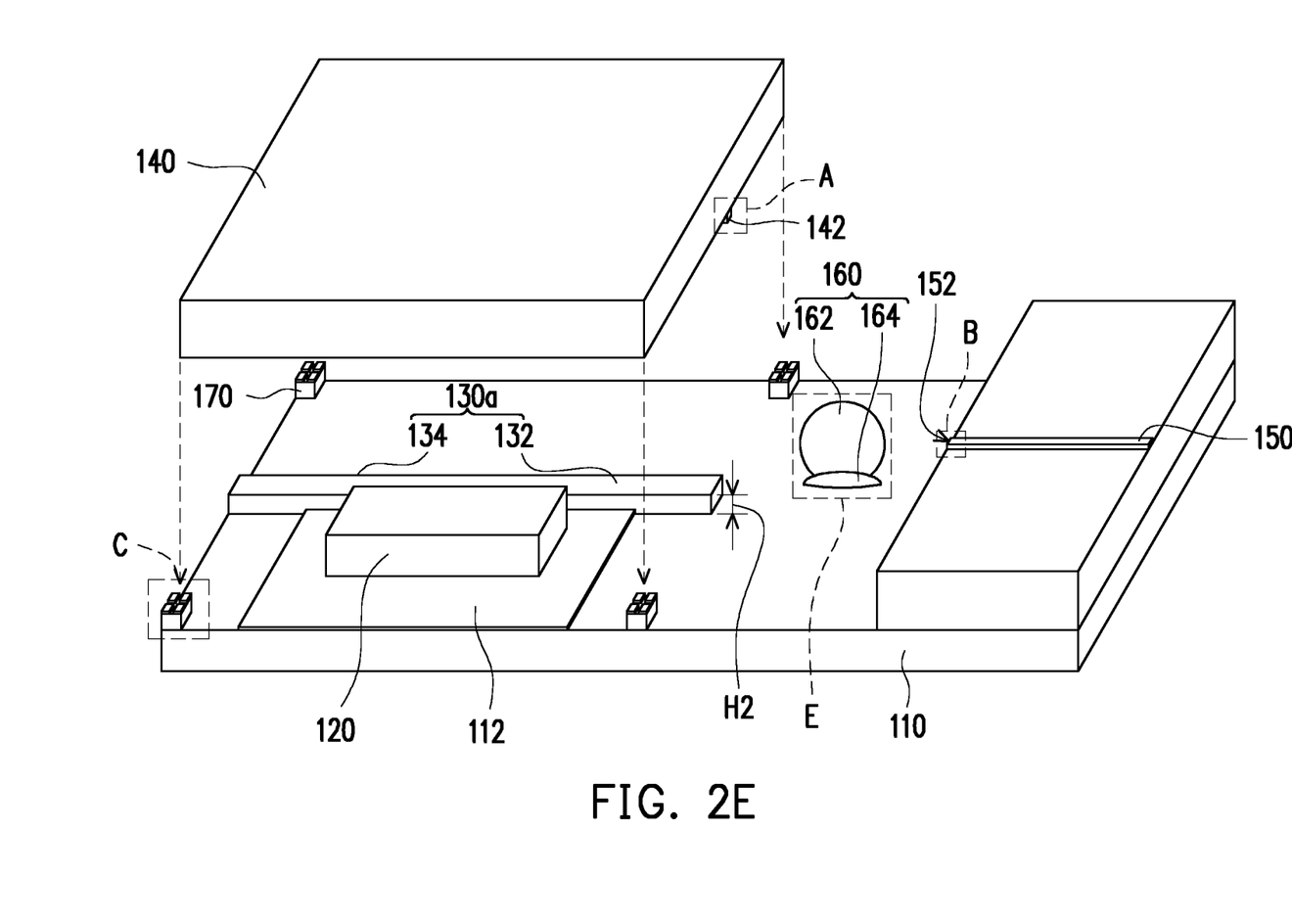
FIG. 2E is a 3D schematic view of a silicon photonic package structure before a laser diode is assembled to a substrate in another embodiment of the disclosure.

Further, the obstacle structure 130 formed between the conductive bump 120 and the ridge 142 is adopted in the silicon photonic package structure 100 of the present embodiment. Therefore, when the laser diode 140 is being bonded onto the substrate 110, the obstacle structure 130 may block the material of the conductive bump 120 from overflowing to the light-emitting surface 143 of the ridge 142 in a bonding process. In this way, a luminous efficiency of the ridge 142 may be maintained normal. The obstacle structure 130 may include sub-obstacles 132 and 134 respectively disposed at opposite ends of the ridge to respectively block the material of the conductive bump 120 from overflowing to the opposite ends of the ridge 142. However, in another embodiment, as shown by FIG. 2E, the sub-obstacle 132 and the sub-obstacle 134 may also be connected to form a continuous obstacle, that is, a continuous obstacle structure 130a.

In this embodiment, the ball lens 160 is formed by at least two layers of different materials 162 and 164. In FIG. 1A, the material 162 and the material 164 are in an up and down arrangement along the direction perpendicular to the surface of the substrate 110, for example. However, in other embodiments, the two layers of different materials may also be arranged from the inside to the outside, and the material in an inner layer and the material in an outer layer may have different refractive indexes. In this embodiment, a region of the substrate 110 under the ball lens 160 has a flat surface, and the material 162 and the material 164 of the ball lens 160 may be sequentially formed on the flat surface by using a semiconductor wafer process.

In this embodiment, for allowing the light 141 emitted by the light-emitting surface 143 of the ridge 142 to be well converged at the light input end 152 of the mode converter 150, the ridge 142, the ball lens 160 and the mode converter 150 may be made to satisfy $0.1 \leq D1/R \leq 1$ and $0.1 \leq D2/R \leq 1$. Here, D1 is a distance between the light-emitting surface 143 and the ball lens 160, R is half a transmission distance of a light ray transmitted from a center of the light-emitting surface 143 to a center of the light input end 152 in the ball lens 160, and D2 is a distance between the light input end 152 and the ball lens 160.

In this embodiment, the light input end 152 of the mode converter 150 has an inclined light input surface 153 (as shown by FIG. 2B), and the inclined light input surface 153 is inclined relative to a connecting line L1 from a center of the light-emitting surface 143 to a center of the light input end 152 in a direction parallel to the surface of the substrate 110. In this way, a portion of the light 141 incident from the inclined light input surface 153 is prevented from being reflected back into the ridge 142 and entering the laser cavity. In this embodiment, an included angle θ1 between the connecting line L1 from the center of the light-emitting surface 143 to the center of the light input end 152 and the inclined light input surface 153 falls in a range from 80 degrees to 89 degrees. In addition, a surface of the ball lens 160 and the inclined light input surface 153 may be coated with an anti-reflection film, which may also inhibit a portion of the light 141 from being reflected and entering the laser cavity.

In this embodiment, the substrate 110 further includes a plurality of support pillars 170 (as an example, there are four support pillars 170 in FIG. 1A) formed on the substrate 110 and supporting the laser diode 140. Furthermore, in this embodiment, a top portion of each of the support pillars 170 has an alignment mark 172 (which is illustrated as a cross-shaped mark in the drawings as an example). Because the support pillar 170 and the alignment mark 172 thereof can be formed on the substrate 110 by using the semiconductor wafer process, a position and a height of the support pillar 170 are highly accurate so that the laser diode 140 can be well aligned when being assembled thereon.

Further, the surface of the laser diode 140 facing the substrate may also have an alignment mark corresponding to the alignment mark 172. For instance, if the alignment mark 172 is a depression mark (e.g., a cross-shaped depression as illustrated in FIG. 2C), the alignment mark may be a protrusion mark (e.g., a cross-shaped protrusion). Alternatively, the alignment mark 172 may be the protrusion mark, and the alignment mark may be the depression mark.

Figure 3A:
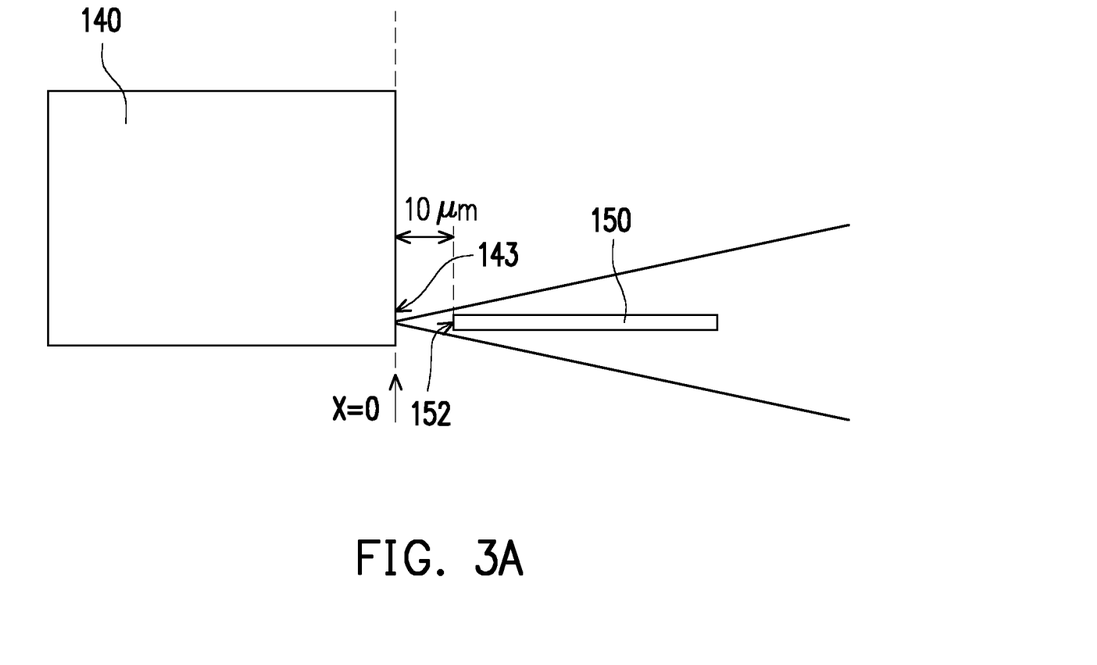
FIG. 3A is a diagram of a position relationship between a laser diode and a mode converter in a silicon photonic package structure in a comparative embodiment of the disclosure.
Figure 3B:
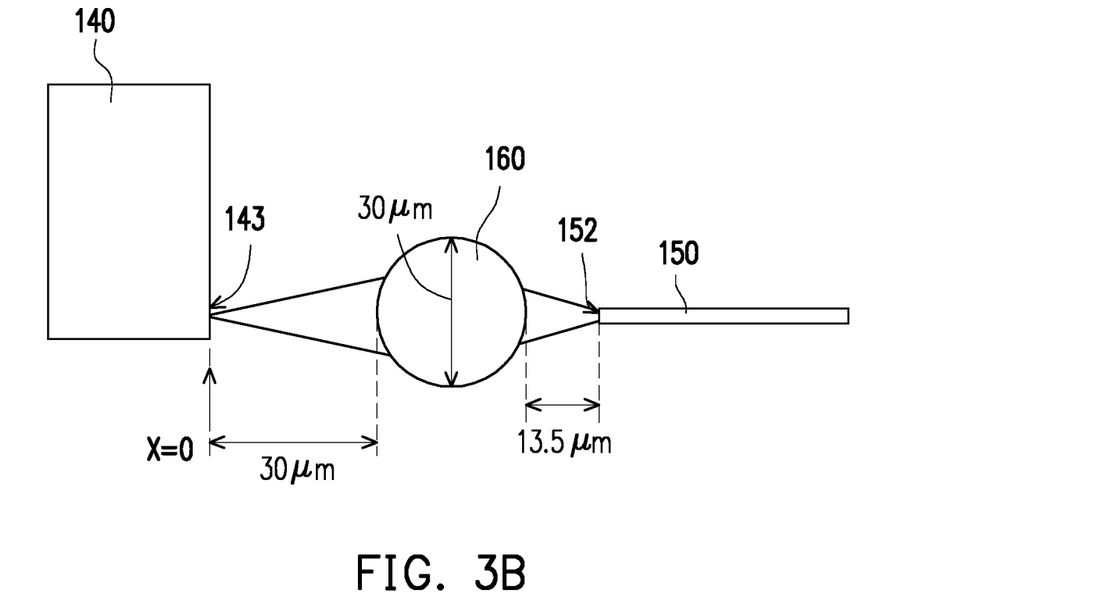
FIG. 3B is a diagram of a position relationship between the laser diode and the mode converter in the silicon photonic package structure of FIG. 1A and FIG. 1B.
Figure 4A:
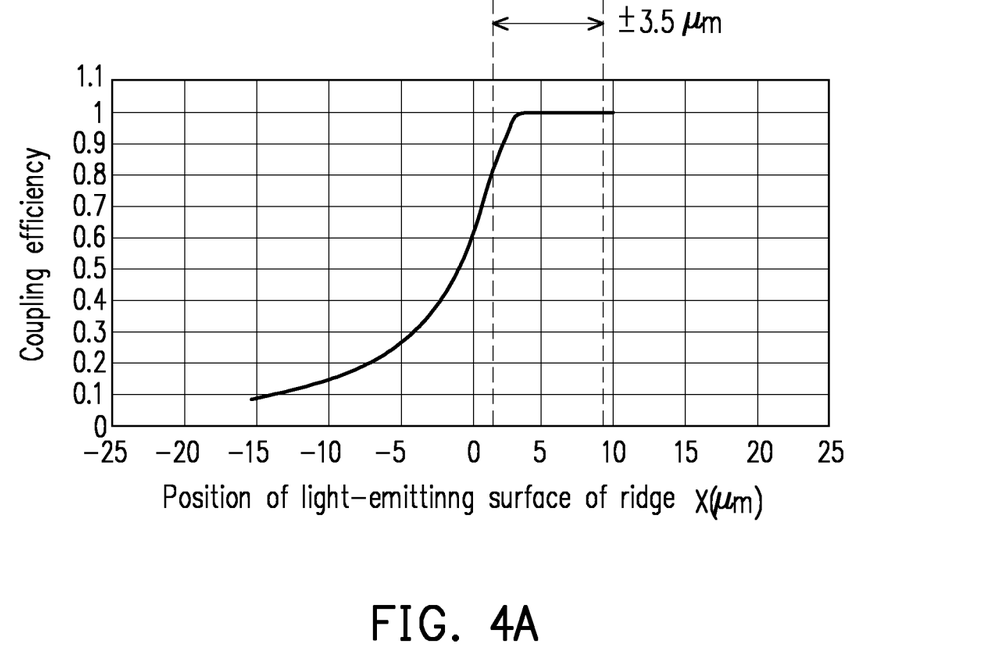
FIG. 4A is a relation curve of a coupling efficiency of the silicon photonic package structure of FIG. 3A versus a position of a light-emitting surface of a ridge.
Figure 4B:
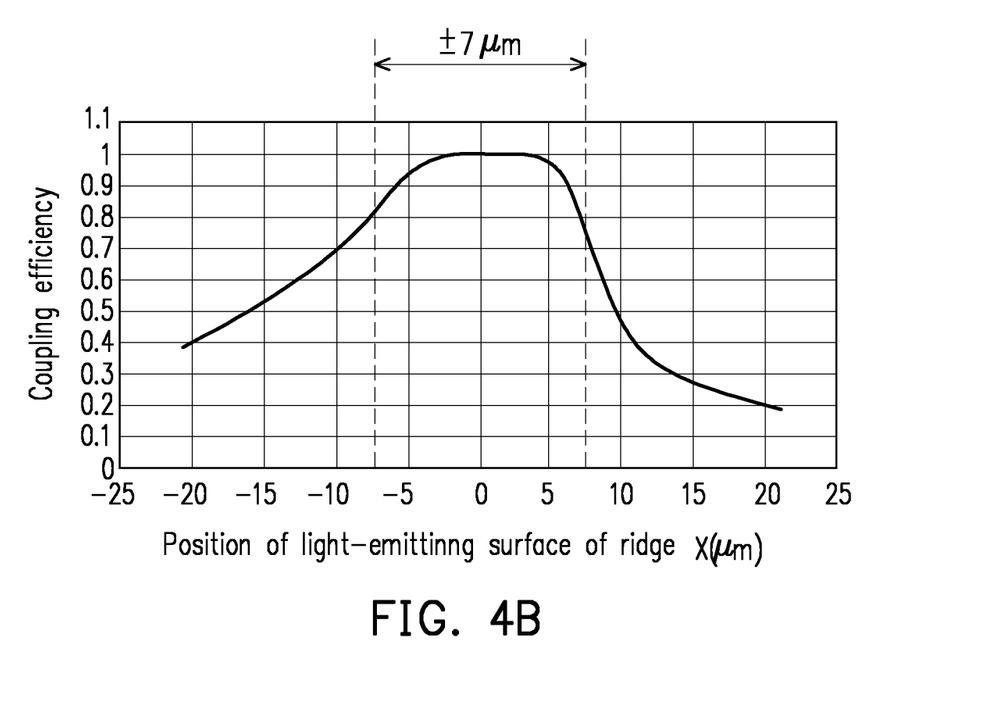
FIG. 4B is a relation curve of a coupling efficiency of the silicon photonic package structure of FIG. 3B versus a position of a light-emitting surface of a ridge.

FIG. 3A is a diagram of a position relationship between a laser diode and a mode converter in a silicon photonic package structure in a comparative embodiment of the disclosure; FIG. 3B is a diagram of a position relationship between the laser diode and the mode converter in the silicon photonic package structure of FIG. 1A and FIG. 1B; FIG. 4A is a relation curve of a coupling efficiency of the silicon photonic package structure of FIG. 3A versus a position of a light-emitting surface of a ridge; and FIG. 4B is a relation curve of a coupling efficiency of the silicon photonic package structure of FIG. 3B versus a position of a light-emitting surface of a ridge. Referring to FIG. 1B, FIG. 3A, FIG. 3B, FIG. 4A and FIG. 4B, in FIG. 3A and FIG. 4A, a position of X=0 refers to a position of the light-emitting surface 143 when a distance between the light-emitting surface 143 of the ridge 142 and the light input end 152 of the mode converter 150 is 10 micrometers (μm); when the position of the light-emitting surface 143 is on the left side of the position of X=0, X is a negative value, and when the position of the light-emitting surface 143 is on the right side of the position of X=0, X is a positive value. Further, in FIG. 3B and FIG. 4B, a position of X=0 refers to a position of the light-emitting surface 143 when a distance between the light-emitting surface 143 of the ridge 142 and the ball lens 160 is 30 μm; when the position of the light-emitting surface 143 is on the left side of the position of X=0, X is a negative value, and when the position of the light-emitting surface 143 is on the right side of the position of X=0, X is a positive value. Moreover, in FIG. 3B, R of the light input end 16 is 15 μm, and a distance between the ball lens 160 and the light input end 152 of the mode converter 150 is 13.5 μm. As can be seen from FIG. 4A, the assembly tolerance of the laser diode 140 in the X direction is ±3.5 μm; and as can be seen from FIG. 4B, the assembly tolerance of the laser diode 140 in the X direction is ±7 μm, and the optical coupling efficiency can reach more than 80% within this error range of ±7 μm. Therefore, it can be confirmed that the silicon photonic package structure 100 of this embodiment can indeed expand the assembly tolerance range of the laser diode 140 to help manufacturers in reducing the precision required for the bonding equipment, thereby increasing the yield rate of the silicon photonic package structure 100 and reducing its manufacturing cost.

In summary, in the silicon photonic package structure of the present embodiment of the disclosure, the ball lens formed on the substrate is adopted to converge the light emitted by the laser diode assembled on the substrate at the mode converter formed on the substrate. Therefore, the assembly tolerance range of the laser diode may be expanded to help manufacturers in reducing the precision required for the bonding equipment, thereby increasing the yield rate of the silicon photonic package structure and reducing its manufacturing cost. Further, the obstacle structure formed between the conductive bump and the ridge is adopted in the silicon photonic package structure of the present embodiment of the disclosure. Therefore, when the laser diode is being bonded onto the substrate, the obstacle structure may block the material of the conductive bump from overflowing to the light-emitting surface of the ridge in the bonding process. In this way, the luminous efficiency of the ridge may be maintained normal.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A silicon photonic package structure, comprising:
a substrate;
a conductive bump, disposed on the substrate;
an obstacle structure, disposed on the substrate;
a laser diode, disposed above the substrate, and electrically bonded to the conductive bump, a surface of the laser diode facing the substrate having a ridge, an end of the ridge having a light-emitting surface, wherein the obstacle structure is located between the conductive bump and the ridge, and a thickness of the obstacle structure in a direction perpendicular to the surface of the substrate is greater than a thickness of the ridge in the direction perpendicular to the surface of the substrate;
a mode converter, formed on the substrate; and
a ball lens, formed on the substrate, and located between the light-emitting surface and a light input end of the mode converter, wherein the ball lens converges a light emitted by the light-emitting surface at the light input end of the mode converter, and a volume of the laser diode is larger than a volume of the ball lens.

2. The silicon photonic package structure according to claim 1, wherein the ball lens is formed by at least two layers of different materials.

3. The silicon photonic package structure according to claim 1, wherein a region of the substrate under the ball lens has a flat surface.

4. The silicon photonic package structure according to claim 1, wherein a distance between the light-emitting surface and the ball lens is D1, half a transmission distance of a light ray transmitted from a center of the light-emitting surface to a center of the light input end in the ball lens is R, and $0.1 \leq D1/R \leq 1$.

5. The silicon photonic package structure according to claim 1, wherein a distance between the light input end and the ball lens is D2, half a transmission distance of a light ray transmitted from a center of the light-emitting surface to a center of the light input end in the ball lens is R, and $0.1 \leq D2/R \leq 1$.

6. The silicon photonic package structure according to claim 1, wherein the substrate further comprises a plurality of support pillars formed on the substrate and supporting the laser diode.

7. The silicon photonic package structure according to claim 6, wherein a top portion of each of the support pillars has an alignment mark.

8. The silicon photonic package structure according to claim 1, wherein the light input end of the mode converter has an inclined light input surface, and the inclined light input surface is inclined relative to a connecting line from a center of the light-emitting surface to a center of the light input end in a direction parallel to the surface of the substrate.

9. The silicon photonic package structure according to claim 8, wherein an included angle between the connecting line from the center of the light-emitting surface to the center of the light input end and the inclined light input surface falls in a range from 80 degrees to 89 degrees.

10. The silicon photonic package structure according to claim 1, wherein the mode converter is a waveguide.

* * * * *